United States Patent
Kizu et al.

(10) Patent No.: US 7,259,211 B2
(45) Date of Patent: Aug. 21, 2007

(54) ETHYLENE TYPE TERNARY COPOLYMER AND PROPYLENE TYPE RESIN COMPOSITION

(75) Inventors: Kouichi Kizu, Sodegaura (JP); Keiji Okada, Sodegaura (JP); Masayoshi Yamaguchi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 217 days.

(21) Appl. No.: 10/996,435

(22) Filed: Nov. 26, 2004

(65) Prior Publication Data

US 2005/0131158 A1   Jun. 16, 2005

(30) Foreign Application Priority Data

Dec. 12, 2003  (JP)  ............... 2003-414236

(51) Int. Cl.
*C08L 23/00* (2006.01)
(52) U.S. Cl. ...................... 525/240; 524/515
(58) Field of Classification Search ............ None
See application file for complete search history.

(56) References Cited

U.S. PATENT DOCUMENTS 5,391,618 A    2/1995 Yamamoto et al.

FOREIGN PATENT DOCUMENTS

| EP | A-0374783 A2 | 6/1990 |
|---|---|---|
| JP | 6-192500 | 7/1994 |
| JP | 8-302096 | 11/1996 |
| JP | 09-087330 A | 3/1997 |
| JP | A-10-273563 | 10/1998 |
| KR | 2003-0033398 A | 5/2003 |
| WO | WO96/08521 | 3/1996 |
| WO | WO99/24483 | 5/1999 |
| WO | WO 00/05280 | 2/2000 |

OTHER PUBLICATIONS

Supplementary European Search Report issued Sep. 22, 2006 in corresponding European Application No. 04257720.5.

*Primary Examiner*—James J. Seidleck
*Assistant Examiner*—Gennadiy Mesh
(74) *Attorney, Agent, or Firm*—Buchanan Ingersoll & Rooney PC

(57) ABSTRACT

(i) A material is developed which modifies the rigidity, tensile elongation at break and impact resistance of resins such as a polypropylene resin when used as a modifier. The invention relates to an ethylene type ternary copolymer (A) comprising (i) an ethylene, propylene or 1-butene and a higher α-olefin having 6 to 20 carbon atoms, wherein the content of ethylene is 70 to 89 mol %, the content of propylene or 1-butene is 10 to 22 mol % and the content of a higher α-olefin having 6 to 20 carbon atoms is 1 to 11 mol % and the molar ratio of the higher-olefin having 6 to 20 carbon atoms to the structural units except for ethylene (either propylene or 1-butene and the higher α-olefin having 6 to 20 carbon atoms) is 1/10 to 5/10 and the ethylene type ternary copolymer has a density of 0.857 to 0.885 g/cm$^3$. The invention also relates to (ii) a propylene type resin composition comprising a propylene type polymer (B), the ethylene type ternary copolymer (A) and an inorganic filler (C).

6 Claims, No Drawings

ETHYLENE TYPE TERNARY COPOLYMER AND PROPYLENE TYPE RESIN COMPOSITION

BACKGROUND OF THE INVENTION

1. Field of the Invention

The present invention relates to an ethylene type ternary copolymer useful as a modifier for resins such as a polypropylene and also to a propylene type resin composition containing this ethylene type ternary copolymer.

2. Description of the Related Art

Conventionally, Measures taken to compound elastomers, such as an ethylene/propylene copolymer and ethylene/butene copolymer, as a modifier in a polypropylene resin with the intention of improving the tensile elongation at break and impact resistance of a polypropylene resin have been well known.

However, if an elastomer is compounded in a polypropylene resin, the rigidity of the resin is dropped and there is therefore limitation to the amount of the elastomer to be compounded. Also, there is the case where it is demanded of, for instance, resin molded articles such as a polypropylene resin molded article to have not only impact resistance at normal temperature but also impact resistance at low temperatures. Therefore, such a modifier as to retain the balance between rigidity and impact resistance at a high level is desired.

On the other hand, it is demanded of resin molded articles such as those mentioned above not to be broken in practical use. Therefore, it is demanded of these resin molded articles to have high tensile strength at break and impact strength while maintaining high rigidity. Specifically, it has been desired to develop a resin modifier which also has a high level of balance between rigidity and tensile elongation at break.

A trial is made to obtain a composition having a good quality balance between rigidity and impact resistance by compounding an ethylene/propylene copolymer or an ethylene/butene copolymer having specific properties in a polypropylene polymer. However, this composition is inferior in the balance between rigidity and impact resistance. If an ethylene/α-olefin copolymer obtained by copolymerizing a higher α-olefin having many carbon atoms, namely a higher α-olefin having 6 or more carbon atoms is compounded, the tensile elongation at break is improved. However, these α-olefins are expensive and it is therefore necessary to limit the amount of these α-olefins to the minimum (see, for example, Publication of JP-A No. 6-192500 or Publication of JP-A No. 8-302096). Also, a ternary copolymer of ethylene/propylene or 1-butene/α-olefin having 6 to 20 carbon atoms is also disclosed. However, this copolymer does not aim at the use of a polypropylene polymer modifier (Publication of JP-A No. 9-87330).

SUMMARY OF THE INVENTION

The present invention has the intention of solving the prior art problem as mentioned above and relates to an ethylene type ternary copolymer which can modify the rigidity and particularly tensile elongation at break and impact resistance of a resin such as a polypropylene resin when used as a modifier. The present invention also relates to a polypropylene resin composition comprising an ethylene type ternary copolymer such as those mentioned above.

The present invention relates to (A) an ethylene type ternary copolymer which is a copolymer of an ethylene, an α-olefin selected from propylene and 1-butene and a higher α-olefin having 6 to 20 carbon atoms, wherein;

(i) the content of ethylene (the ratio of a repeat unit derived from ethylene) is 70 to 89 mol %, the content of propylene and/or 1-butene (the ratio of repeat units derived from propylene and/or 1-butene) is 10 to 22 mol % and the content of a higher α-olefin having 6 to 20 carbon atoms (the ratio of a repeat unit derived from a higher α-olefin) is 1 to 11 mol % (where the total ratio of ethylene, propylene or 1-butene and the higher α-olefin having 6 to 20 carbon atoms is 100 mol %);

(ii) the molar ratio of the higher-olefin having 6 to 20 carbon atoms to the structural units except for ethylene (any one of propylene and 1-butene and the higher α-olefin having 6 to 20 carbon atoms) is 1/10 to 5/10;

(iii) the ethylene type ternary copolymer has a density of 0.857 to 0.880 g/cm$^3$ (excluding 0.880 g/cm$^3$);

(iv) the ethylene type ternary copolymer has a melt flow rate (MFR) is 0.1 to 50.0 g/10 min at 190° C. under a load of 2.16 kg;

(v) the ethylene type ternary copolymer has the characteristics that the ratio (MFR$_{10}$/MFR$_2$) of the melt flow rate (MFR$_{10}$) at 190° C. under a load of 10 kg to the melt flow rate (MFR$_2$) at 190° C. under a load of 2.16 kg is 5.0 to 10.0; and (vi) the glass transition temperature measured by a differential scanning type calorimeter (DSC) is −55° C. or less and the degree of crystallization is 20% or less.

Ethylene type ternary copolymers such as those mentioned above are useful as a resin modifier.

The present invention also relates to a propylene type resin composition comprising a propylene type polymer (B), the above ethylene type ternary copolymer (A) and an inorganic filler (C) wherein the content of the propylene type polymer (B) is 50 to 89% by weight, the content of the inorganic filler (C) is 0 to 25% by weight and the content of the ethylene type ternary copolymer (A) is 5 to 40% by weight (where the total amount of the propylene type polymer (B), the ethylene type ternary copolymer (A) and the inorganic filler (C) is 100% by weight).

The melt flow rate (MFR) of the above propylene type polymer (B) is 0.01 g/10 minutes or more at 230° C. under a load of 2.16 kg.

The composition of the present invention may be made into a molded article and is suitable to form, especially, an injection molded article. Car interior or exterior materials, parts for electric products, miscellaneous goods and various container materials according to the present invention are constituted of molded articles comprising the above propylene type resin composition.

When the ethylene type ternary copolymer of the present invention is used as a modifier for thermoplastic resins and particularly, a polypropylene, it is possible to improve the balance between the rigidity and the elongation at break/impact strength of the resin. Also, good operability in modification is obtained.

DETAILED DESCRIPTION OF THE INVENTION

An ethylene type ternary copolymer and a propylene type resin composition according to the present invention will be explained in detail.

Ethylene Type Ternary Copolymer (A)

The ethylene type ternary copolymer (A) used in the present invention is obtained by copolymerizing at least a total of three types of monomers including ethylene, at least one type selected from propylene and/or 1-butene and at least one type selected from higher α-olefins having 6 to 20 carbon atoms.

Examples of the higher α-olefin having 6 to 20 carbon atoms include 1-hexene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-octene, 3-ethyl-1-hexene, 1-octene, 1-decene, 1-dodecene, 1-tetradecene, 1-hexadecene, 1-octadecene and 1-eicosene. Among these compounds, 1-hexene, 1-octene and 1-decene are preferable. Monomers selected from higher α-olefins having 6 to 20 carbon atoms may be used in combinations of two or more.

(i) Composition

In the ethylene type ternary copolymer (A) used in the present invention, the content of ethylene (the ratio of a repeat unit derived from ethylene) is 70 to 89 mol %, the content of propylene or 1-butene (the ratio of a repeat unit derived from propylene or 1-butene) is 10 to 22 mol %, the content of the higher α-olefin having 6 to 20 carbon atoms (the ratio of a repeat unit derived from the higher α-olefin) is 1 to 11 mol %. Preferably, the content of ethylene (the ratio of a repeat unit derived from ethylene) is 75 to 85 mol %, the content of propylene or 1-butene (the ratio of a repeat unit derived from propylene or 1-butene) is 11 to 18 mol %, the content of the higher α-olefin having 6 to 20 carbon atoms (the ratio of a repeat unit derived from the higher α-olefin) is 2 to 9 mol %.

(ii) Ratio of the Higher α-Olefin Having 6 to 20 Carbon Atoms

The ethylene type ternary copolymer (A) used in the present invention has the characteristics that the molar ratio of the higher α-olefin having 6 to 20 carbon atoms to the structural units (either propylene or 1-butene and the higher α-olefin having 6 to 20 carbon atoms) except for ethylene is 1/10 to 5/10, preferably 1/10 to 4.5/10 and more preferably 1/10 to 4/10.

(iii) Density

The ethylene type ternary copolymer (A) used in the present invention has a density range from 0.857 to 0.880 g/cm$^3$ (excluding 0.880 g/cm$^3$), preferably from 0.857 to 0.875 g/cm$^3$ and more preferably from 0.857 to 0.865 g/cm$^3$.

(iv) Melt Flow Rate (MFR)

The ethylene type ternary copolymer (A) used in the present invention has a melt flow rate (MFR) of 0.1 to 50.0 g/10 min, preferably 0.1 to 30.0 g/10 min and more preferably 0.1 to 10.0 g/10 min at 190° C. under a load of 2.16 kg.

The ethylene type ternary copolymer (A) used in the present invention is characterized by the above qualities and preferably has the following qualities (v) to (vii).

(v) $MFR_{10}/MFR_2$

The ethylene type ternary copolymer (A) used in the present invention has the characteristics that the ratio ($MFR_{10}/MFR_2$) of the melt flow rate ($MFR_{10}$) at 190° C. under a load of 10 kg to the melt flow rate ($MFR_2$) at 190° C. under a load of 2.16 kg is 5.0 to 10.0, preferably 5.2 to 8.0 and more preferably 5.4 to 7.0.

(vi) Glass Transition Temperature and Degree of Crystallization

The glass transition temperature of the ethylene type ternary copolymer (A) used in the present invention which is measured by a differential scanning type calorimeter (DSC) is −55° C. or less and the copolymer has a degree of crystallization of 20% or less.

(vii) Mw/Mn

Mw/Mn of the ethylene type ternary copolymer (A) used in the present invention is 1.5 to 3.0 and preferably 1.8 to 2.5.

Method of Producing the Ethylene Type Ternary Copolymer (A)

The ethylene type ternary copolymer (A) like this may be produced, for example, by copolymerizing ethylene, either propylene or 1-butene and a higher α-olefin having 6 to 20 carbon atoms in the presence of a metallocene catalyst as described in JP-A No. 10-273563.

Such a metallocene catalyst may be formed of a metallocene compound (a), an organic aluminum oxy compound (b) and/or a compound (c) which reacts with the metallocene compound (a) to form an ion pair and may also be formed of (a), (b) and/or (c) and an organic aluminum compound (d).

In the present invention, ethylene, either propylene or 1-butene and a straight-chain or branched higher α-olefin having 6 to 20 carbon atoms are copolymerized usually in a liquid phase under the presence of a metallocene catalyst formed of the metallocene compound (a) as described above, organic aluminum oxy compound (b) and/or an ionized ionic compound (C) and according to the need, an organic aluminum compound (d). Although at this time, a hydrocarbon solvent is generally used, an α-olefin may be used as a solvent.

This copolymerization may be carried out using any of the following methods: a batch system, semi-continuous system and continuous system. When the copolymerization is carried out in a batch system, the above catalyst component is used in the following concentration.

In the case where the metallocene type catalyst comprising the metallocene compound (a), organic aluminum oxy compound (b) or ionized ionic compound (c) is used, the concentration of the metallocene compound (a) in the polymerization system is usually 0.00005 to 0.1 mmol/l (polymerization volume) and preferably 0.0001 to 0.05 mmol/l. Also, the organic aluminum oxy compound (b) is supplied in an amount of 1 to 10000 and preferably 10 to 5000 in terms of molar ratio (Al/transition metal) of an aluminum atom to a transition metal in the metallocene compound in the polymerization system.

In the case of the ionized ionic compound (c), the compound (c) is supplied in an amount of 0.5 to 20 and preferably 1 to 10 in terms of molar ratio (ionized ionic compound (c)/metallocene compound (a)) of the compound (c) to the metallocene compound (a) in the polymerization system. Also, in the case of using the organic aluminum compound, it is used in an amount of usually about 0 to 5 mmol/l (polymerization volume) and preferably about 0 to 2 mmol/l.

The copolymerization is run under the condition of a reaction temperature of −20 to +150° C., preferably 0 to 120° C. and more preferably 0 to 100° C. and a pressure of 0 to 7.8 MPa (80 kgf /cm$^2$, gage pressure) and more preferably 0 to 4.9 MPa (50 kgf/cm$^2$, gage pressure).

Ethylene, one α-olefin which is either propylene or 1-butene and the straight-chain or branched higher α-olefin having 6 to 20 carbon atoms are supplied to the polymer system in such an amount as to prepare the above ethylene type ternary copolymer (A) having the specified composition. In the copolymerization, a molecular weight controller such as hydrogen may be used.

When ethylene, one α-olefin which is either propylene or 1-butene and the straight-chain or branched higher α-olefin having 6 to 20 carbon atoms are copolymerized in the above manner, the target product is usually obtained as a polymer solution containing the ethylene type ternary copolymer (A). This polymer solution is treated by a usual method to obtain the ethylene type ternary copolymer (A).

The ethylene type ternary copolymer of the present invention as mentioned above is useful as a modifier to improve the impact resistance and rigidity of a thermoplastic resin. Examples of the thermoplastic resin may include a polyolefin, polyamide, polyester, polystyrene, polyvinyl chloride and polyvinyl alcohol. When a polar group-containing thermoplastic resin is modified, the ethylene type ternary copolymer according to the present invention may be modified by an unsaturated carboxylic acid.

When the ethylene type ternary copolymer according to the present invention is used as a modifier, it is preferable to use an apparatus, such as an extruder, which continuously kneads and discharges. The kneading is preferably carried out at a temperature higher than the melting point or softening point of a resin to be discharged and lower than 400° C.

If the ethylene type ternary copolymer according to the present invention is used as a modifier, the impact resistance and tensile characteristics of resins such as polypropylene resins can be improved while retaining the rigidity.

Method of Modifying a Resin

A method of modifying a resin according to the present invention comprises melt-blending pellets of the above ethylene type copolymer with a resin to be modified. Such a modifying method makes it possible to obtain a resin composition superior in the balance between rigidity and tensile elongation at break/impact strength. This modifying method is therefore superior in the productivity of a modified thermoplastic resin and in handling ability.

Propylene Type Polymer (B)

The propylene type polymer (B) according to the present invention is a homopolymer of propylene or a copolymer of propylene and ethylene or an α-olefin having 4 to 20 carbon atoms. Examples of the α-olefin having 4 to 20 carbon atoms include ethylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. These α-olefins may be used either singly or in combinations of two or more. These α-olefins may form random copolymers or block copolymers with propylene.

In the present invention, a propylene homopolymer, crystalline propylene/ethylene block copolymer having an ethylene content of 2 to 40 mol % and crystalline propylene/ethylene random copolymer having an ethylene content of 0.5 to 10 mol % are preferable.

Also, the propylene type polymer (B) has a MFR of 0.01 g/10 min or more and has a MFR range from preferably 0.5 to 200 g/10 min and more preferably 1 to 100 g/10 min when measured at 230° C. under a load of 2.16 kg.

Also, the density of the propylene type polymer (B) is generally 0.885 to 0.910 g/cm$^3$, preferably 0.890 to 0.910 g/cm$^3$ and more preferably 0.895 to 0.910 g/cm$^3$.

The refractive index of the propylene type polymer (B) is in a range generally from 1.490 to 1.510, preferably from 1.495 to 1.510 and more preferably from 1.500 to 1.510.

The use of such a propylene type polymer ensures the preparation of a propylene type resin composition which is superior in the balance between rigidity and tensile elongation at break and/or impact resistance and in flowability.

The propylene type polymer (B) having such characteristics may be produced by various methods. The propylene type polymer (B) may be produced using, for example, a catalyst formed of a solid titanium catalyst component and an organic metal compound catalyst component or a highly active titanium catalyst formed of the above both components and an electron-donator, or a catalyst formed of a metallocene compound and aluminoxane or catalysts obtained by mixing these catalysts. In the case where the propylene type polymer (B) is a block copolymer, it may also be produced using a different catalyst selected from the above catalysts in each stage during multistage polymerization.

Inorganic Filler (C)

Specific examples of the inorganic filler to be used may include powdery fillers, e.g., natural silicic acid or silicates such as micropowdery talc, kaolinite, baked clay, pyrophillite, sericite and wollastonite, carbonates such as sedimentating calcium carbonate, heavy calcium carbonate and magnesium carbonate, hydroxides such as aluminum hydroxide and magnesium hydroxide, oxides such as zinc oxide and magnesium oxide and synthetic silicic acid or silicates such as hydrate calcium silicate, hydrate aluminum silicate, hydrate silicic acid and silicic acid anhydride, flake fillers, e.g., mica, fibrous fillers, e.g., a basic magnesium sulfate whisker, calcium titanate whisker, aluminum borate whisker, sepiolite, PMF (Processed Mineral Fiber) zonotolite, potassium titanate and ellestadite and balloon fillers, e.g., glass balloon and fly ash balloon.

In the present invention, talc among these fillers is preferably used. Particularly micropowdery talc having an average particle diameter of 0.01 to 10 μm is preferably used and the average particle diameter may be measured by a liquid phase sedimentation method.

Also, the inorganic filler used in the present invention, particularly, talc may be either untreated or surface-treated in advance. Examples of this surface treatment include chemical or physical treatments using treating agents such as a silane coupling agent, higher fatty acid, fatty acid metal salt, unsaturated organic acid, organic titanate, resin acid and polyethylene glycol. The use of the surface-treated talc makes it possible to obtain car interior or exterior materials and gasoline tanks superior in weld strength, coatability and moldability.

The inorganic fillers as mentioned above may be used in combinations of two or more. Also, in the present invention, organic fillers such as high styrenes, lignin and reclaimed rubber may be used in addition to these inorganic fillers.

Propylene Type Resin Composition

The propylene type resin composition according to the present invention is a composition comprising the propylene type polymer (B), the above ethylene type ternary copolymer (A) and the inorganic filler (C).

The content of the propylene type polymer (B) in the propylene type resin composition is 50 to 89% by weight and more preferably 55 to 80% by weight. The content of the ethylene type ternary copolymer (A) is 5 to 40% by weight and more preferably 15 to 35% by weight. The content of the inorganic filler (C) is 0 to 25% by weight, preferably 1 to 25% by weight and more preferably 5 to 20% by weight (the total amount of the propylene type polymer (B), ethylene type ternary copolymer (A) and inorganic filler (C) is 100% by weight).

The propylene type resin composition according to the present invention preferably has a peak of attenuation factor (tan δ) caused by the glass transition temperature of the propylene type polymer (B) and a peak of attenuation factor (tan δ) caused by the glass transition temperature of the ethylene type ternary copolymer (A) and these both peaks are preferably separated from each other when the temperature dependency of elastic modulus is measured at intervals of 2° C. and plotted. The case where two peaks clearly appear: specifically the case where a saddle part exists between the maximum points of the two peaks is judged to be "separated". A propylene type resin composition having such "separated" two peaks is superior in impact resistance and rigidity. In the case where two peaks do not appear clearly but are "united", there is the case where the impact resistance and rigidity of a propylene type polymer composition drop.

The propylene type resin composition according to the present invention has a elongation at break percentage (EL) of 150% or more and preferably 180% to 400% and;

the relation between the elongation at break percentage (EL) and the flexural elastic modulus (FM) is given by the following equations:

$$EL \geq -0.24\, FM + 580$$

and preferably;

$$EL \geq -0.24\, FM + 585$$

the relation between the impact strength (IZ) (−30° C.) and the flexural elastic modulus (FM) is given by the following equations:

$$IZ(-30°\,C.) \geq -0.142\, FM + 275$$

and preferably;

$$IZ(-30°\,C.) \geq -0.142\, FM + 280$$

The propylene type resin composition according to the present invention preferably satisfies the equations expressing the relation between the elongation at break percentage (EL) and the flexural elastic modulus (FM) and the relation between the impact strength (IZ) (−30° C.) and the flexural elastic modulus (FM) at the same time.

With regard to a method of preparing the olefin type resin composition according to the present invention, the propylene type polymer (B), the ethylene type ternary copolymer (A) and the inorganic filler (C) may be kneaded using a conventionally known method such as a mixing method using internal mixers such as a banbury mixer, kneader and intermix to thereby produce the resin composition.

In the preparation of the propylene type resin composition according to the present invention, a styrene type thermoplastic elastomer may be compounded to the extent that the object of the present invention is not impaired. Examples of the styrene type thermoplastic elastomer include block copolymers of styrenes and conjugate diene compounds. Examples of the styrenes include styrene and alkylstyrenes such as α-methylstyrene, p-methylstyrene and p-t-butylstyrene, p-methoxystyrene and vinylnaphthalene and combinations of these compounds. Among these compounds, styrene is preferable. Examples of the conjugate diene compound include butadiene, isoprene, piperilene, methylpentadiene, phenylbutadiene, 3,4-dimethyl-1,3-hexadiene and 4,5-diethyl-1,3-octadiene and combinations of these compounds. Among these compounds, butadiene and isoprene are preferable.

Specific examples of the styrene type thermoplastic elastomer may include styrene/butadiene block copolymers, styrene/butadiene/styrene triblock copolymers, styrene/isoprene diblock copolymers, styrene/isoprene/styrene triblock copolymers, hydrogenated products of styrene/butadiene diblock copolymers, hydrogenated products of styrene/butadiene/styrene triblock copolymers, hydrogenated styrene/isoprene diblock copolymers and hydrogenated products of styrene/isoprene/styrene triblock copolymers.

In the present invention, it is preferable to use styrene type thermoplastic elastomers in which the ratio by weight of the structural unit derived from the styrene type compound to the structural unit derived from the conjugate diene compound is 10/90 to 65/35 and preferably 20/80 to 50/50. The molecular structure of the styrene type thermoplastic elastomer may be a straight-chain, branched or radial structure or a combination of these structures.

Also, in the present invention, besides the aforementioned propylene type polymer (B), ethylene type ternary copolymer (A) and inorganic filler (C), additives including a nuclear agent, antioxidant, hydrochloric acid absorber, softener, photo-stabilizer, ultraviolet absorber, lubricant, aging preventive, processing adjuvant, heat-resistance stabilizer, weatherability stabilizer, antistatic agent, flame retardant, pigments, dyes, dispersant, copper inhibitor, neutralizer, foaming agent, plasticizer, cell preventive, crosslinking agent, flow characteristic improver such as a peroxide, weld strength improver and anti-hazing agent may be compounded to the extent that the object of the present invention is not impaired.

Molded Articles

The propylene type resin composition according to the present invention may be widely used in conventionally known applications of polyolefins and maybe molded into molded articles having various forms by known molding methods without any particular limitation to these methods to utilize it. The propylene type resin composition is preferably molded, particularly, into injection molded articles among these molded articles. Injection molding of the propylene type resin composition is usually carried out at a resin temperature of 200 to 250° C., and under an injection pressure of, usually, 800 to 1400 kg/cm$^2$ though depending on the shape of an injection molded article.

The propylene type resin composition of the present invention is superior in moldability such as flowability during injection molding. Particularly, injection molded articles which scarcely show flow marks and have excellent appearance can be obtained from the propylene type resin composition according to the present invention.

Injection molded articles prepared from the propylene type resin composition according to the present invention is resistant to electrification and is superior in rigidity, heat resistance, impact resistance, surface gloss, chemical resistance and abrasive resistance and is therefore used in a wide range of applications. These articles can be preferably used in a wide range of applications including car interior materials such as trims, inter panels and column covers, car exterior materials such as fenders, bumpers, side moors, wheel covers, mat guards and mirror covers, housings, parts of domestic electric products such as washing tubs, container materials such as containers and usual miscellaneous products.

These articles can be preferably used in, among these applications, applications such as car interior or exterior materials such as fenders, bumpers, side moors, mat guards and mirror covers, housings, parts of domestic electric products such as washing tubs, container materials such as containers, which enable utilization of such characteristics that they are superior in all of the properties including rigidity, heat resistance and impact resistance and also in appearance.

The purpose of improving the balance between tensile elongation at break and impact resistance while retaining the rigidity of a polypropylene type resin is attained by using an ethylene type ternary copolymer constituted of ethylene, either propylene or 1-butene and one type selected from higher α-olefins having 6 to 20 carbon atoms as a modifier.

EXAMPLES

The present invention will be explained in more detail by way of examples. These examples should not be construed as limiting the scope of the invention.

The qualities of each resin component were evaluated in the following manner.

1. Qualities of the Ethylene Type Ternary Copolymer (A)

(Density)

A strand obtained after its MFR was measured at 190° C. under a load of 2.16 kg was heat-treated at 120° C. for one hour and gradually cooled to ambient temperature over one hour to measure its density by a density gradation tubing method.

(α-olefin content)

Determined by $^{13}$C-NMR spectrum.

(Limiting viscosity [η])

Determined at 135° C. in decaline (Mw/Mn)

Measured using GPC (gel permeation chromatography) at 140° C. in an orthodichlorobenzene solvent.

(MFR)

Determined by measuring MFR$_2$ at a predetermined temperature under a load of 2.16 kg according to ASTM D-1238.

(MFR$_{10}$/MFR$_2$)

Determined by measuring MFR$_{10}$ at 190° C. under a load of 10 kg and MFR$_2$ at 190° C. under a load of 2.16 kg according to ASTM D-1238 and by calculating the ratio of the both.

(Glass Transition Temperature)

Found from an endothermic curve plotted when the sample was raised at a rate of 30° C./min from normal temperature to 200° C., then kept at this temperature for 5 minutes, then dropped at a rate of 10° C./min to 150° C. and then raised at a rate of 10° C./min.

(Degree of Crystallization)

Found by calculating heat of fusion per unit weight from the endothermic peak when DSC was measured and by dividing the heat of fusion by the heat (70 cal/g) of fusion of a polyethylene crystal.

2. Qualities of the Propylene Type Polymer (B)

(Density)

A strand obtained after its MFR was measured at 230° C. under a load of 2.16 kg was heat-treated at 120° C. for one hour and gradually cooled to ambient temperature over one hour to measure its density by a density gradation tubing method.

(MFR)

Determined by measuring MFR$_2$ at a predetermined temperature under a load of 2.16 kg according to ASTM D-1238.

Examples 1 to 4, Comparative Example 1

Ethylene Type Ternary Copolymer

A SUS autoclave which had a capacity of 1.5 l and was equipped with a stirrer and in which the atmosphere was fully substituted with nitrogen was charged with 700 ml of hexane and 30 ml of 1-octene at 23° C. Next, the autoclave was heated to 40° C. as the internal temperature with rotating the stirrer. When the temperature reached 40° C., propylene was introduced to adjust the internal pressure to 1.6 kg/cm$^2$. Further, the internal total pressure was raised to 8 kg/cm$^2$ by adding ethylene. When the internal pressure in the autoclave reached 8 kg/cm$^2$, 1.0 ml of a decane solution containing 1.0 mM/ml of triisobutylaluminum (TIBA) was forcedly introduced into the autoclave by using nitrogen. In succession, 3 ml of a toluene solution prepared in advance and containing triphenylcarbenium (tetrakispentafluorophenyl) borate in an amount of 0.016 mM based on B and [dimethyl(t-butylamido)(tetramethyl-η5-cyclopentadienyl) silane]titan dichloride in an amount of 0.004 mM was introduced forcedly into the autoclave by using nitrogen to start polymerization.

The internal temperature of the autoclave was controlled to 40° C. for 30 minutes after that and ethylene was supplied directly such that the pressure in the autoclave was 8 kg/cm$^2$. 5 ml of methanol was introduced into the autoclave by a pump 30 minutes after the polymerization started, to stop the polymerization and the pressure in the autoclave was dropped to the atmosphere. 2 l of acetone was poured into the reaction solution with stirring. The resulting rubber ball-like polymer containing a solvent was dried at 130° C. under 60 torr for 13 hours. As a result, 38 g of an ethylene/propylene/octene copolymer containing 17.1 mol % of propylene and 3.8 mol % of 1-octene was obtained.

The fundamental characteristics of the resulting ethylene/propylene/octene copolymer (A-1) are shown in Table 1. Also, ethylene type ternary copolymers (A-2) to (A-5) were obtained in the same manner as above except that the type of monomer and the amount to be charged were altered such that the copolymer compositions shown in Table 1 were obtained. The fundamental characteristics of the resulting copolymers (A-2) to (A-5) are shown in Table 1.

Comparative Examples 2 and 3

Ethylene/α-Olefin Copolymer

A SUS autoclave which had a capacity of 1.5 l and was equipped with a stirrer and in which the atmosphere was fully substituted with nitrogen was charged with 690 ml of hexane and 60 ml of 1-butene at 23° C. Next, the autoclave was heated to 40° C. as the internal temperature with rotating the stirrer. When the temperature reached 40° C., the internal total pressure was raised to 8 kg/cm$^2$ by adding ethylene. When the internal pressure in the autoclave reached 8 kg/cm$^2$, 1.0 ml of a decane solution containing 1.0 mM/ml of triisobutylaluminum (TIBA) was forcedly introduced into the autoclave by using nitrogen. In succession, 3 ml of a toluene solution prepared in advance and containing triphenylcarbenium (tetrakispentafluorophenyl)borate in an amount of 0.016 mM based on B and

[dimethyl(t-butylamido)(tetramethyl-η5-cyclopentadienyl) silane]titan dichloride in an amount of 0.004 mM was introduced forcedly into the autoclave by using nitrogen to start polymerization.

The internal temperature of the autoclave was controlled to 40° C. for 30 minutes after that and ethylene was supplied directly such that the pressure in the autoclave was 8 kg/cm$^2$. 5 ml of methanol was introduced into the autoclave by a pump 30 minutes after the polymerization started to stop the polymerization and the pressure in the autoclave was dropped to the atmosphere. 2 l of acetone was poured into the reaction solution with stirring. The resulting rubber ball-like polymer containing a solvent was dried at 130° C. under 60 torr for 13 hours. As a result, 35 g of an ethylene/1-butene copolymer containing 19 mol % of 1-butene was obtained.

The fundamental characteristics of the resulting ethylene/1-butene copolymer (A-6) are shown in Table 1. Also, an ethylene/α-olefin copolymer (A-7) was obtained in the same manner as above except that the type of monomer and the amount to be charged were altered such that the copolymer composition shown in Table 1 was obtained. The fundamental characteristics of the resulting copolymer (A-7) are shown in Table 1.

TABLE 1

| Copolymer | Example 1 (A-1) | Example 2 (A-2) | Example 3 (A-3) | Example 4 (A-4) | Comparative Example 1 (A-5) | Comparative Example 2 (A-6) | Comparative Example 3 (A-7) |
|---|---|---|---|---|---|---|---|
| α-olefin 1 | Propylene | Propylene | 1-Butene | 1-Butene | Propylene | 1-Butene | 1-Octene |
| Charge amount in the polymerization (ml) | 1.6[a)] | 1.3[a)] | 73 | 68 | 1.6[a)] | 90 | 135 |
| Content of α-olefin 1 (mol %) | 17.1 | 14.0 | 13.1 | 13.3 | 16.7 | 19 | 19 |
| α-olefin 2 | 1-Octene | 1-Octene | 1-Octene | 1-Octene | 1-Octene | — | — |
| Charge amount in the polymerization (ml) | 30 | 40 | 30 | 48 | 10 | — | — |
| Content of α-olefin 2 (mol %) | 3.8 | 5.5 | 4.3 | 6.5 | 1.4 | — | — |
| Ethylene content (mol %) | 79.1 | 80.5 | 82.6 | 80.2 | 81.9 | 81 | 81 |
| Density (g/cm3) | 0.862 | 0.861 | 0.863 | 0.859 | 0.867 | 0.862 | 0.858 |
| [η] | 1.8 | 1.9 | 1.8 | 1.9 | 1.8 | 1.7 | 1.7 |
| Mw/Mn | 2.2 | 2.3 | 2.1 | 2.2 | 2.2 | 1.9 | 2.1 |
| MFR(g/10 min) | 1.0 | 0.9 | 1.1 | 1.0 | 0.9 | 1.2 | 1.1 |
| MFR10/MFR2 | 5.4 | 5.8 | 6.1 | 6.3 | 5.5 | 6.3 | 6.4 |
| Tg (° C.) | −55.1 | −57.4 | −61.3 | −64.8 | −51.4 | −62.9 | −65.1 |
| Degree of crystallization (%) | 15.8 | 14.6 | 13.1 | 10.5 | 19.5 | 12.1 | 10.0 |
| Tm (° C.) | 47.0 | 43.6 | 41.3 | 37.1 | 50.2 | 35.8 | 34.2 |

[a)]Unit of the amount of propylene to be charged: kg/cm$^2$

Also, the propylene type polymer (B) and inorganic filler (C) to be used in the present invention are shown in Tables 2 and 3.

TABLE 2

| Type of polypropylene | B<br>Block polypropylene |
|---|---|
| MFR (g/10 min) | 65 |
| Amount of decane-soluble component at normal temperature (wt %) | 10.5 |
| Decan-soluble component at normal temperature [η](dl/g) | 8.2 |
| Decan-insoluble component at normal temperature I5 | 0.975 |
| Decan-insoluble component at normal temperature MFR(g/10 min) | 135 |

TABLE 3

| Inorganic filler | C<br>talc |
|---|---|
| Average particle diameter (micron) | 2.5 |

Example 5

65% by weight of a block polypropylene (trade name: Mitsui Polypro J739E, MFR=65 g/10 min) manufactured by Mitsui Chemicals, Inc.) (B), 10% by weight of talc and, as stabilizers, 0.1% by weight of calcium stearate, 0.1% by weight of Irganox 1010 and 0.1% by weight of Irganox 168 were added to 25% by weight of the resulting ethylene type ternary copolymer (A-1). The mixture was melt-kneaded at 200° C. by using a two-shaft extruder and pelletized by a pelletizer. The resulting pellets were injection-molded at 200° C. by using a 55 t injection molding machine manufactured by Toshiba Machine Co., Ltd. The resulting molded articles were subjected to tests to measure tensile strength at break, tensile elongation at break, flexure elastic modulus and impact strength by using the evaluation methods shown below. The results are shown in Table 4.

(Tensile Strength at Break (TS), Tensile Elongation at Break (EL))

Measured at ambient temperature according to ASTM D638.

(Flexure Elastic Modulus (FM))

Measured using a 2-mm-thick test piece, which was obtained by injection molding in a predetermined condition, according to ASTM D 790 under the following condition: span: 32 mm and bending rate: 5 m/min.

(Impact Strength (IZ))

Measured using a 3-mm-thick test piece (rear notch) according to ASTM D 256 at 23° C. and −30° C.

Examples 6 to 10

Molded articles were produced in the same manner as in Example 5 except that the ethylene type ternary copolymers (A-2) to (A-4) were used in the amounts shown in Table 4, and evaluated in the same manner as in Example 5. The results are shown in Table 4.

Comparative Example 4

A molded article was produced in the same manner as in Example 5 except that the ethylene type ternary copolymer (A-5) was used and evaluated in the same manner as in Example 5. The results are shown in Table 4.

Comparative Examples 5 and 6

Molded articles were produced in the same manner as in Example except that the ethylene/α-olefin copolymers (A-6) and (A-7) were used and evaluated in the same manner as in Example 5. The results are shown in Table 4.

TABLE 4

| | Example 5 | Example 6 | Example 7 | Example 8 | Example 9 | Example 10 | Comparative Example 4 | Comparative Example 5 | Comparative Example 6 |
|---|---|---|---|---|---|---|---|---|---|
| Block polypropylene B | 65 | 65 | 65 | 65 | 70 | 70 | 65 | 65 | 65 |
| Modifier component A-1 | 25 | | | | | | | | |

TABLE 4-continued

|  | Example 5 | Example 6 | Example 7 | Example 8 | Example 9 | Example 10 | Comparative Example 4 | Comparative Example 5 | Comparative Example 6 |
|---|---|---|---|---|---|---|---|---|---|
| A-2 |  | 25 |  |  |  |  |  |  |  |
| A-3 |  |  | 25 |  | 20 |  |  |  |  |
| A-4 |  |  |  | 25 |  | 20 |  |  |  |
| A-5 |  |  |  |  |  |  | 25 |  |  |
| A-6 |  |  |  |  |  |  |  | 25 |  |
| A-7 |  |  |  |  |  |  |  |  | 25 |
| Inorganic filler (talc) C | 10 | 10 | 10 | 10 | 10 | 10 | 10 | 10 | 10 |
| FM (MPa) | 1430 | 1410 | 1410 | 1400 | 1680 | 1663 | 1420 | 1400 | 1420 |
| EL (%) | 240 | 250 | 250 | 260 | 180 | 200 | 180 | 120 | 230 |
| TS (MPa) | 17.1 | 17.1 | 17.3 | 17.5 | 18.6 | 18.5 | 16.0 | 16.4 | 17.0 |
| IZ (J/m)(23° C.) | 710 | 715 | 718 | 735 | 580 | 590 | 630 | 642 | 710 |
| IZ (J/m)(−30° C.) | 74 | 76 | 78 | 80 | 40 | 40 | 62 | 73 | 65 |

As is clear from Table 4, the molded articles obtained from the propylene type resin compositions of Examples 6 to 10 were superior in the balance between flexure elastic modulus, tensile strength at break, tensile elongation at break and impact resistance.

The propylene type resin composition of the present invention is superior in moldability such as flowability during injection molding. Particularly, injection molded articles which scarcely show flow marks and have excellent appearance can be obtained from the propylene type resin composition of the present invention.

The injection molded article prepared from the propylene type resin composition of the present invention is resistant to electrification and is superior in rigidity, heat resistance, impact resistance, surface gloss, chemical resistance and abrasive resistance and is therefore used in a wide range of applications. These articles can be used in a wide range of applications including car interior materials such as trims, inter panels and column covers, car exterior materials such as fenders, bumpers, side moors, wheel covers, mat guards and mirror covers, housings, parts of domestic electric products such as washing tubs, container materials such as containers and usual miscellaneous products. These articles can be preferably used in, among these applications, applications such as car interior or exterior materials such as fenders, bumpers, side moors, mat guards and mirror covers, housings, parts of domestic electric products such as washing tubs, container materials such as containers, which enable utilization of such characteristics that they are superior in all of the properties including rigidity, heat resistance and impact resistance and also in appearance.

The purpose of improving the balance between tensile elongation at break and impact resistance while retaining the rigidity of a polypropylene type resin is attained by using an ethylene type ternary copolymer constituted of ethylene, either propylene or 1-butene and a higher α-olefin selected from higher α-olefins having 6 to 20 carbon atoms as a modifier.

What is claimed is:

1. An ethylene ternary copolymer (A), which is a copolymer of ethylene, propylene or 1-butene and a higher α-olefin having 6 to 20 carbon atoms, wherein;

(i) the content of ethylene (the ratio of a repeat unit derived from ethylene) is 75 to 85 mol %, the content of propylene and/or 1-butene (the ratio of repeat units derived from propylene and/or 1-butene) is 11 to 18 mol % and the content of a higher α-olefin having 6 to 20 carbon atoms (the ratio of a repeat unit derived from a higher α-olefin) is 2 to 9 mol % (where the total ratio of ethylene, propylene or 1-butene and the higher α-olefin having 6 to 20 carbon atoms is 100 mol %);

(ii) the molar ratio of the higher α-olefin having 6 to 20 carbon atoms to the structural units except for ethylene (any one of propylene and 1-butene and the higher α-olefin having 6 to 20 carbon atoms) is 1/10 to 5/10;

(iii) the ethylene ternary copolymer has a density of 0.857 to 0.880 g/cm$^3$ (excluding 0.880 g/cm$^3$); and (iv) the ethylene ternary copolymer has a melt flow rate (MFR) is 0.1 to 50.0 g/10 min at 190° C. under a load of 2.16 kg.

2. A propylene resin composition comprising a propylene polymer (B), the ethylene ternary copolymer (A) of claim 1 and an inorganic filler (C), wherein the content of the propylene polymer (B) is 50 to 89% by weight, the content of the ethylene ternary copolymer (A) is 5 to 40% by weight and the content of the inorganic filler (C) is 0 to 25% by weight (where, the total amount of the propylene polymer (B), the ethylene ternary copolymer (A) and the inorganic filler (C) is 100% by weight).

3. A molded article comprising the propylene resin composition according to claim 2.

4. An injection molded article comprising the propylene resin composition according to claim 2.

5. The injection molded article according to claim 4, the article being car interior or exterior material or parts for electric product.

6. The injection molded article according to claim 4, the article being a container material.

* * * * *